United States Patent
Sun et al.

(10) Patent No.: US 8,447,626 B2
(45) Date of Patent: May 21, 2013

(54) SYSTEM AND METHOD FOR CONTEXT DEPENDENT SERVICE DISCOVERY FOR MOBILE MEDICAL DEVICES

(75) Inventors: Xiaolu Sun, Shanghai (CN); Heriburt Baldus, Aachen (DE); Karin Klabunde, Aachen (DE); Lei Feng, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 1195 days.

(21) Appl. No.: 11/996,817

(22) PCT Filed: Jul. 17, 2006

(86) PCT No.: PCT/IB2006/052439
§ 371 (c)(1),
(2), (4) Date: Jan. 25, 2008

(87) PCT Pub. No.: WO2007/012998
PCT Pub. Date: Feb. 1, 2007

(65) Prior Publication Data
US 2008/0233925 A1 Sep. 25, 2008

Related U.S. Application Data

(60) Provisional application No. 60/704,022, filed on Jul. 29, 2005.

(51) Int. Cl.
*G06Q 10/00* (2012.01)
*G06F 15/16* (2006.01)
(52) U.S. Cl.
USPC ................ 705/2; 709/218; 709/217

(58) Field of Classification Search
USPC ........................................... 705/2
See application file for complete search history.

(56) References Cited

U.S. PATENT DOCUMENTS

| 6,721,537 | B1 | 4/2004 | Briesemeister |
| 6,909,721 | B2 | 6/2005 | Ekberg et al. |
| 7,222,160 | B2 * | 5/2007 | Hlasny ........................ 709/217 |

(Continued)

FOREIGN PATENT DOCUMENTS

| EP | 1197178 A1 | 4/2002 |
| EP | 1536612 A1 | 6/2005 |

(Continued)

*Primary Examiner* — Hiep V Nguyen

(57) ABSTRACT

A medical communication system (10) comprises peer devices (44, 46) which provide medical services which are used for patient monitoring, patient management or other medical procedures involving patients and/or clinicians. A mobile device (12) includes a short-range interface device (22) for discovering peer devices (44, 46) and associated peer devices services (66). A positioning component (14) determines a location of the mobile device (12). An identification component (60) reads a patient identification device (48) and a clinician identification device (50) and identifies a patient (32) and a clinician (30) at the location of the mobile device (12). A visibility manager (120) limits information and services available to the mobile device (12) to current context relevant information and services which are based at least on one of the identity of the patient (32), the identity of the clinician (30), and the identified mobile device location.

20 Claims, 4 Drawing Sheets

U.S. PATENT DOCUMENTS

| | | |
|---|---|---|
| 2002/0173295 A1 | 11/2002 | Nykanen et al. |
| 2003/0058808 A1 | 3/2003 | Eaton et al. |
| 2003/0119446 A1 | 6/2003 | Fano et al. |
| 2003/0164862 A1* | 9/2003 | Cadiz et al. .................. 345/838 |
| 2004/0088374 A1* | 5/2004 | Webb et al. .................. 709/218 |
| 2004/0199056 A1 | 10/2004 | Husemann et al. |
| 2005/0021369 A1 | 1/2005 | Cohen et al. |
| 2005/0058109 A1* | 3/2005 | Ekberg .......................... 370/338 |
| 2005/0101844 A1 | 5/2005 | Duckert et al. |
| 2006/0288095 A1* | 12/2006 | Torok et al. .................. 709/223 |

FOREIGN PATENT DOCUMENTS

| | | |
|---|---|---|
| JP | 2003309486 A | 10/2003 |
| JP | 2005062231 A | 3/2005 |
| JP | 2005063269 A | 3/2005 |

* cited by examiner

SYSTEM AND METHOD FOR CONTEXT DEPENDENT SERVICE DISCOVERY FOR MOBILE MEDICAL DEVICES

CROSS REFERENCE TO RELATED APPLICATIONS

This application claims the benefit of U.S. provisional application Ser. No. 60/704,022 filed Jul. 29, 2005, which is incorporated herein by reference.

The following relates to the network systems and methods. It finds particular application in conjunction with short-range medical wireless network systems and will be described with particular reference thereto. However, it is to be appreciated that the invention will also find application in conjunction with other network systems and the like.

Short-range wireless systems typically have a range of less than one hundred meters, but may connect to the Internet to provide communication over longer distances. Short-range wireless systems include, but are not limited to, a wireless personal area network (PAN) and a wireless local area network (LAN). A wireless PAN uses low-cost, low-power wireless devices that have a typical range of about ten meters. An example of a wireless PAN technology is the IEEE 802.15.1 Bluetooth Standard. An example of a wireless LAN technology is the IEEE 802.11x Wireless LAN Standards.

A Bluetooth device includes, but is not limited to, a mobile telephone, personal or laptop computer, and personal electronic device such as a personal digital assistant (PDA), pager, a portable-computing device, or a medical device. Each Bluetooth device includes application and operating system programs including service discovery protocols which are designed to discover other Bluetooth devices (i.e. peer devices) as they enter and leave the communication range of the networks.

The service discovery protocols, known in the industry, are designed to support zero-configuration, "invisible" networking, and automatic discovery for a breadth of device categories from a wide range of vendors. E.g., a device can dynamically join a network, obtain an address, convey its capabilities, learn about the presence and capabilities of other devices, and conduct a peer-to-peer communication, all automatically without user intervention and invisibly to the user.

Currently, in the architecture of most service discovery protocols, service providers just announce the availability (when services are started) and unavailability (when services are stopped) of their services into the network. All devices directly connected to the network automatically get the service information and store it into or remove it from each device local repository. With many devices within a hospital network, comprehensive service information is stored and removed, quite frequently, into the devices' local repository. This creates some problems such as the communication and processing overhead which is caused by an unnecessary service discovery. Also, devices store and display service information that the users actually have no interest in, or are not even authorized to use. Such information overflow is cumbersome for users and may even lead to wrong configurations, possibly resulting in medical errors in clinical applications.

One approach is to manage the information based on context and relevance by displaying it on the user displays. The user then can select the information and services that are relevant. However, such association of the user to the relevant information and services is time-consuming and may lead to mistakes as some important information may be omitted.

The present invention provides a new and improved apparatus and method which overcomes the above-referenced problems and others.

In accordance with one aspect, a communication system is disclosed. Medical peer devices each includes a peer-to-peer interface and provides services for medical procedures, as for patient monitoring. A mobile device includes a short-range wireless interface device to discover medical peer devices and associated peer devices services and to communicate with these devices. A positioning component enables that a central positioning system determines the location of the mobile device, or that the mobile device itself can determine its location. An identification component reads a patient identification device and identifies a patient at the location of the mobile device; and reads a clinician identification device and identifies a clinician at the location of the mobile device. A visibility manager limits information and services available to the mobile device to current context relevant information and services which are based at least on one of the identity of the patient, the identity of the clinician, and the identified mobile device location.

In accordance with another aspect, a communication method is disclosed. A location of a mobile device is identified. An object is identified by an identification tag associated with the object. Peer devices and associated peer devices services are discovered via a short-range interface device. Information and services available to the mobile device are limited to current context relevant information and services which are based at least on one of the identity of the object, and the identified mobile device location.

One advantage of the present invention resides in automatic connection of clinician's terminals to patient specific networks.

Another advantage resides in reduced time associated with discovery of short-range medical devices.

Another advantage resides in reduced time associated with association of clinician's terminal to patient specific applications and access to patient specific data.

Another advantage resides in automatic configuration of the clinician's mobile device with respect to the preferences of the clinician and the specific care situation.

Yet another advantage resides in overall improvement of patient-specific healthcare applications and simplification of workflows.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

Figure 1:
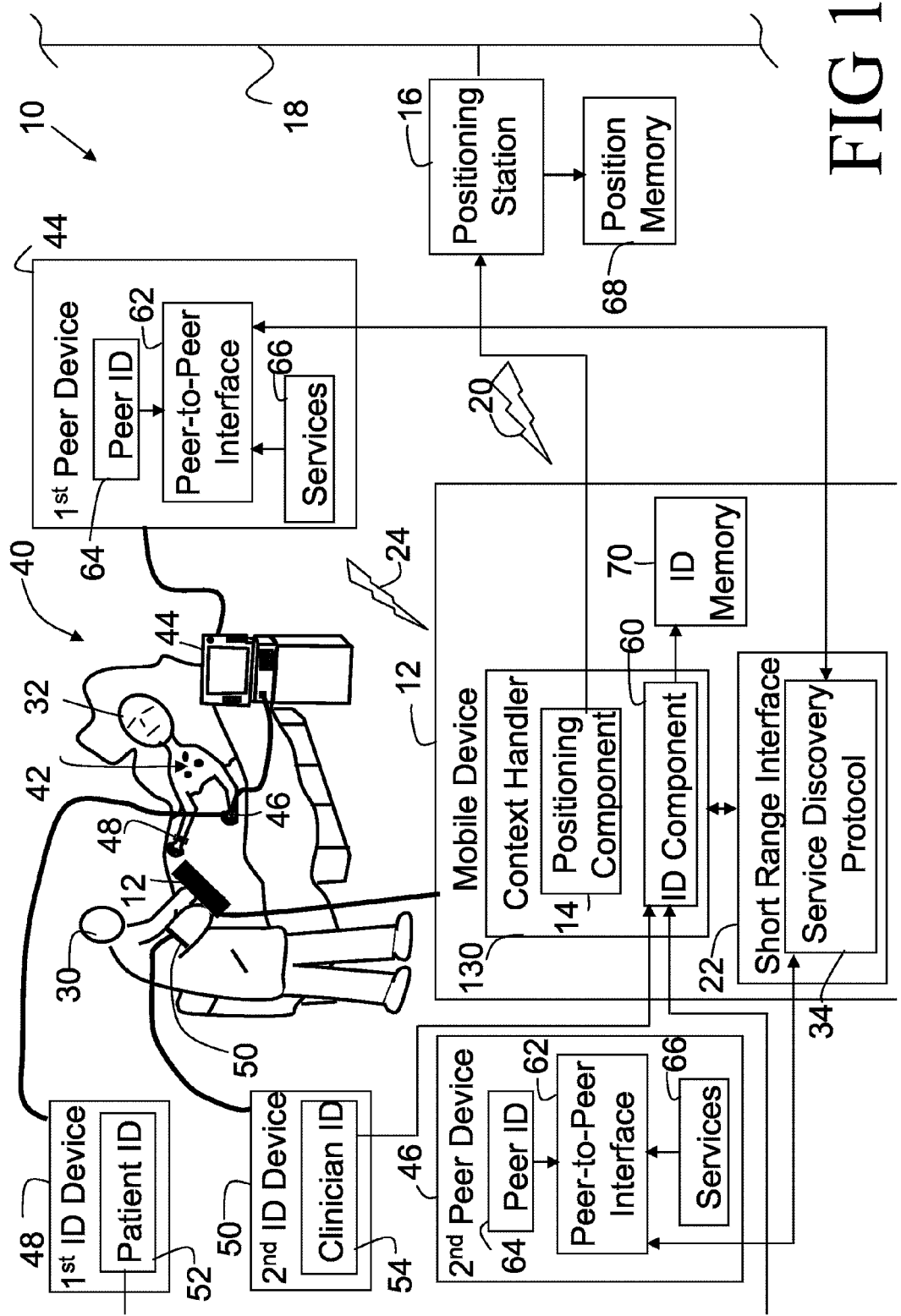
FIG. 1 is a diagrammatic illustration of a medical communication system.

With reference to FIG. 1, a context relevant communication system 10 includes wireless mobile devices 12 owned by a single administrative entity, e.g. a hospital, an enterprise, a factory, or the like. Each mobile device 12 includes a positioning component 14 which is, for example, via software-protocols connected to a hospital positioning system 16, which is in operative communication with a hospital network 18, by wireless link or links 20. In one embodiment, the hospital positioning system 16 is a central positioning system. The hospital positioning system 16 and the positioning component 14 communicate to obtain the position of each mobile device 12 via known indoor positioning technologies. In one embodiment, the hospital positioning system 16 and the positioning component 14 communicate wirelessly. For example, the hospital network 18 includes the wireless technology infrastructure and each positioning component 14 includes a WLAN card. Examples of a WLAN technology are the IEEE 802.11x Wireless LAN Standards. Other examples of positioning technologies are IR tags, RF tags, short range RF beacons, and the like.

Each mobile device 12 further includes a short-range or first interface or device 22 which allows the mobile device 12 to communicate peer-to-peer with other medical peer devices located nearby and to access one or more services provided by other medical or peer devices via wireless link or links 24. For example, a physician or clinician or health care professional 30 can provide a service to a patient 32, e.g. administer a medication, check a status of the monitoring equipment, and the like, by using the mobile device 12 via one of known peer-to-peer communications technologies. An example of a wireless short-range technology is the Bluetooth Standard. The Bluetooth Standard operates in the 2.4 GHz Industrial, Scientific, and Medical (ISM) band and provides a peak airlink speed of one Mbps and a power consumption low enough for use in personal, portable electronics such as a personal digital assistance or mobile phone. A description of the Bluetooth communication protocol and device operation principles is in *Bluetooth Special Interest Group, Specification of the Bluetooth Standard*, version 1.0B, volumes 1 and 2, December 1999. Of course, it is contemplated that the local device uses other short-range technologies such as IEEE 802.15.4 ZigBee, and the like short-range communication technologies.

Each Bluetooth device includes application and operating system programs designed to find other Bluetooth devices as the other devices enter and leave the communication range of the network. The requesting Bluetooth device is in a client role and the responding Bluetooth device is in a server role to establish a link between the two devices. The requesting and responding Bluetooth devices use the link 24 and a service discovery protocol 34, as one provided by UPnP, to discover the services offered by the other Bluetooth devices and how to connect to those services. A service description, created using a description language and an appropriate vocabulary, is made available for query matching as discussed in detail below.

With continuing reference to FIG. 1, in the illustrated example, the communication system 10 includes a wireless or wired patient point-of-care network 40 which includes: (i) sensor nodes 42 disposed on the patient 32 to monitor vital signs such as electrocardiographic (ECG) data, heart rate, respiratory rate, respiratory cycle, blood pressure, or so forth; and (ii) a first peer or medical device, e.g. bedside blood oxygen saturation ($SpO_2$) monitor 44, connected with a second peer or medical device, e.g. an $SpO_2$ fingertip probe 46. The wireless or wired point-of-care network is an example, and those skilled in the art can readily include additional or other medical devices such as high resolution sensors, bedside monitors, ventilators, and the like in the network. Moreover, the point-of-care network can be changed on an ad hoc basis by adding or removing medical devices.

It will be appreciated that wires or cabling are not necessarily completely omitted from the wireless patient point-of-care network—for example, the $SpO_2$ fingertip probe 46 may be connected with the $SpO_2$ monitor 44 by a cable. Similarly, although not illustrated, it is contemplated that some of the devices of the patient point-of-care network may include power cords connected to house electricity. For example, although as illustrated, the $SpO_2$ monitor 44 is battery-powered, it could instead or additionally include a power cord plugged into a conventional electrical power outlet.

The patient point-of-care network further includes a first or patient identification device 48. In the illustrated embodiment, the patient identification device 48 is disposed on a wristband worn by the medical patient 32; however, more generally the patient identification device 48 can be worn or attached to the patient 32 substantially anywhere. Likewise, the clinician 30 is equipped with a clinician or second identification device 50. The identification devices 48, 50 store unique identification codes or corresponding patient and clinician ID 52, 54 which pertain to a particular person and are read by an identification or ID component 60 via use of one of known identification technologies. For example, a barcode marker which contains a unique identification number (ID) can be attached to the patient's and/or clinician's body, e.g. with a wrist band, and read with a barcode scanner. As another example, the patient and clinician identification codes 52, 54 can be stored in an RFID-tag and read with an RFID reader. Of course, it is contemplated that the ID codes 52, 54 can be read by a use of one of known wireless technologies.

In some cases, the mobile device may use the same wireless interface both for discovering (and communicating with) the medical devices and being located by the hospital positioning system.

The first and second peer devices 44, 46 optionally also wirelessly communicate with each other via peer-to-peer communications by using one of the short-range communications technologies. Each medical device offers a set of medical services and can demand access to a set of medical services available at other devices. The patient identification device 50 optionally also includes patient monitoring or therapy functionality, such as an ECG, $SpO_2$, or other sensor.

With continuing reference to FIG. 1, in the illustrated example, the clinician 30 is visiting the patient 32 in a patient room. The clinician 30 communicates with the devices of the patient's 32 point-of-care network via an associated mobile device 12, which includes the positioning component 14 such as a 802.11b interface for a hospital-wide connectivity, the short-range interface 22 such as Bluetooth interface for local peer-to-peer connectivity, and the identification component 60 such as an RF tag reader for reading the patient and clinician identification codes 52, 54. The medical devices 44, 46 each includes a peer-to-peer or second interface 62 such as Bluetooth interface. When the clinician 30 enters a patient room, the hospital central positioning station 16 locates the clinician's mobile device via the positioning component 14. The clinician's position is stored in a position memory 68. The identification component 60 of the mobile device 12 reads the clinician ID 54 and identifies the clinician 30. The read clinician ID code is stored in an ID memory 70. The clinician 30 identifies the patient 32 while the identification component 60 of the mobile device 12 reads the patient ID code 52 from the patient identification device 48. The read patient ID code is stored in the ID memory 70. The service discovery protocol 34 of the mobile device 12 identifies the peer devices 44, 46 in the patient room. E.g., each peer ID 64 and associated peer device services 66 are identified. Descriptions for each discovered peer and associated services are created. All other medical devices that are not in the current location are filtered out. As discussed in detail below, the local services offered at the mobile device 12 are limited to those available at the current location of the mobile device 12, e.g. the patient room. E.g., the medical devices, which are associated to the identified patient 32 and the associated medical devices services are available and displayed on the screen of the mobile device 12. In this scenario, the location of room and patient ID and clinician ID are the context information. The context information is used by the running application in the mobile device 12 to filter out irrelevant medical devices and services. The displayed information is less cluttered and more accurate. The filtering of the unrelated information and services is done automatically, so it is easier for the clinician 30 to conduct her/his work.

Figure 2:
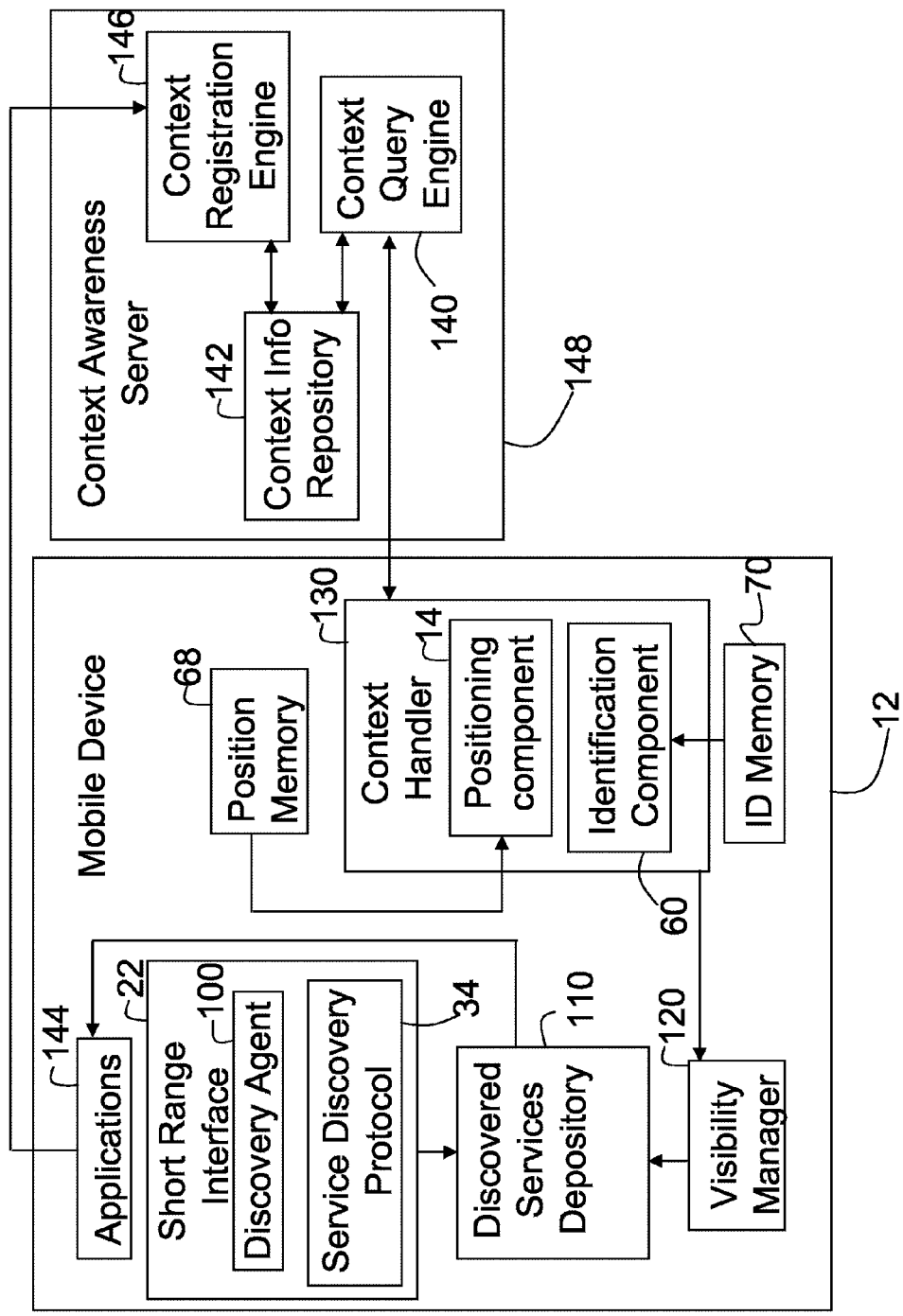
FIG. 2 is a diagrammatic illustration of a portion of one example of a medical communication system.
Figure 3:
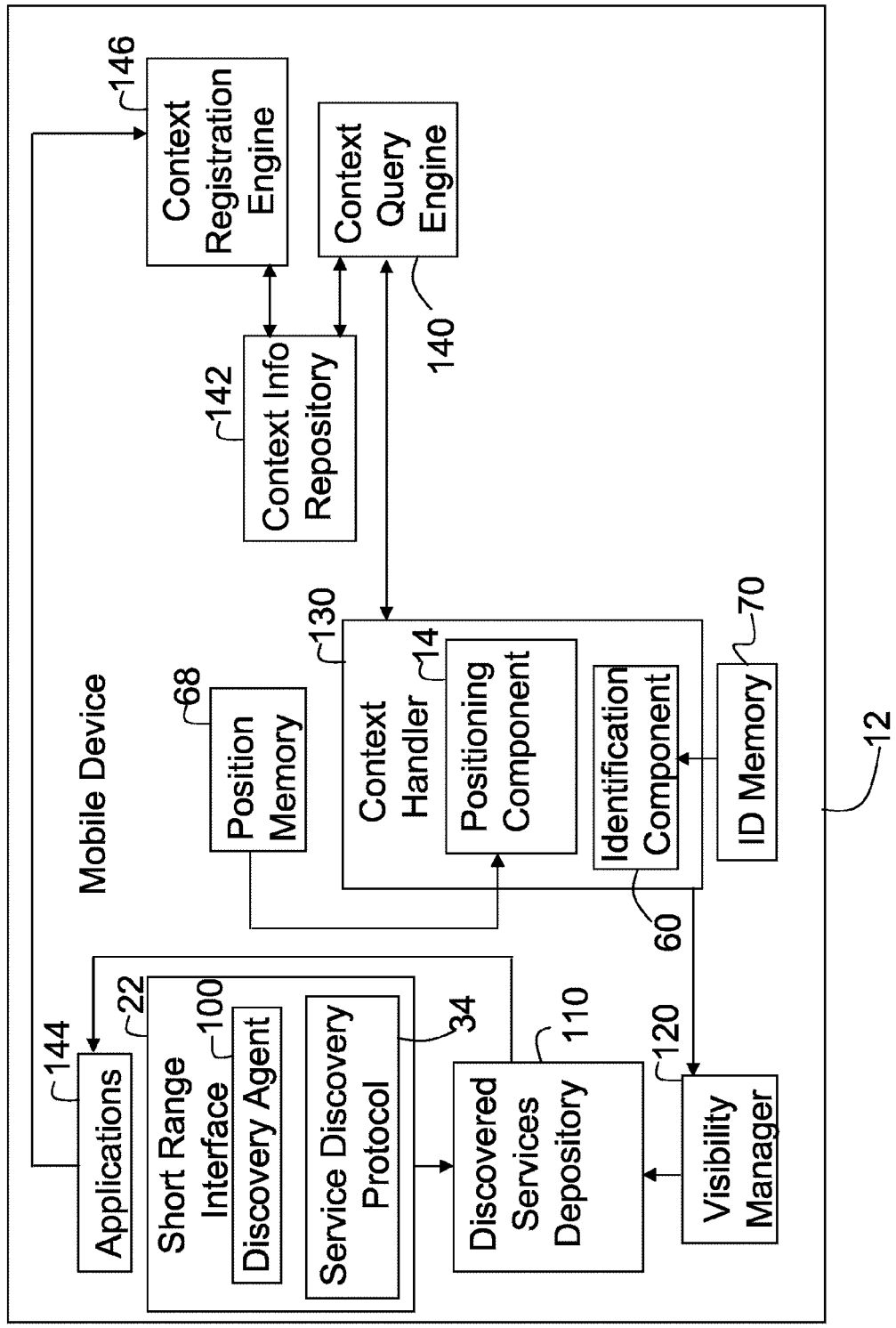
FIG. 3 is a diagrammatic illustration of a portion of another example of a medical communication system.

With reference to FIGS. 2 and 3, during the initialization of an associated mobile device 12, a discovery agent 100 searches for other short-range mobile devices 12 or peers 44, 46 and associated services 66 by using the service discovery protocol(s) 34 such as a UPnP stack. The discovery agent 100 stores the information about the located peers 44, 46 and services 66 in a discovered services repository 110. The discovered services repository 110 includes a discovered peer record, a discovered service record, and a visibility record. For example, the discovered peer record includes peer identification code, peer name, and peer description. The discovered service record includes peer identification code, service identification code, service name, and service description. The visibility record is set by a visibility manager 120 as discussed in detail below. A context handler 130 locates context information such as a mobile device location and patient identification by using any available positioning and identification technologies as discussed above.

The context handler 130 queries detailed context information from a context query engine 140. The context query engine 140 retrieves the detailed context information from a context information repository 142 and returns the retrieved detailed context information to the context handler 130. The information, which is stored in the context information repository 142, includes context service information record which is recorded for applications 144 at the time each application 144 registers associated context and service information with a context registration engine 146. For example, the context service information record includes application identification code, context identification code, peer identification code, and service identification code. The context query engine 140 returns to the context handler 130 a retrieved detailed context information which, for example, includes context identification code, peer identification code, service identification code, and application identification code.

After getting the notification of changes of the context information from the context handler 130, the visibility manager 120 uses the updated detailed context information to set a visibility flag of peers and associated services in the visibility record of the discovered services repository 110. For example, the visibility record includes peer identification code, service identification code, application identification code, and visibility flag. The visibility flag can be set to visible or invisible by changing, for example, a flag from 0 to 1. The context handler 130 continually monitors the change of the current context information and queries the detailed context information from the context query engine 140. The context query engine 140 retrieves the updated detailed context information from the context information depository 142. The context handler 130 notifies the visibility manager 120 about any change in the context information. Before setting the visibility flag in the visibility record, the existing visibility setting in the discovered services repository 110 is reset to invisible, e.g. the visibility flag is set to 0. In this manner, the upper applications use the visibility information to filter out context unrelated services information.

With continuing reference to FIG. 2, the context information repository 142, context query engine 140 and context registration engine 146 are located in a context awareness server 148. Such configuration allows for communications with multiple mobile devices 12.

With reference again to FIG. 3, the context information repository 142, context query engine 140 and context registration engine 146 are located together with the context handler agent in the mobile device. Such configuration is beneficial when the context information can be decided at the side of the mobile device.

Figure 4:
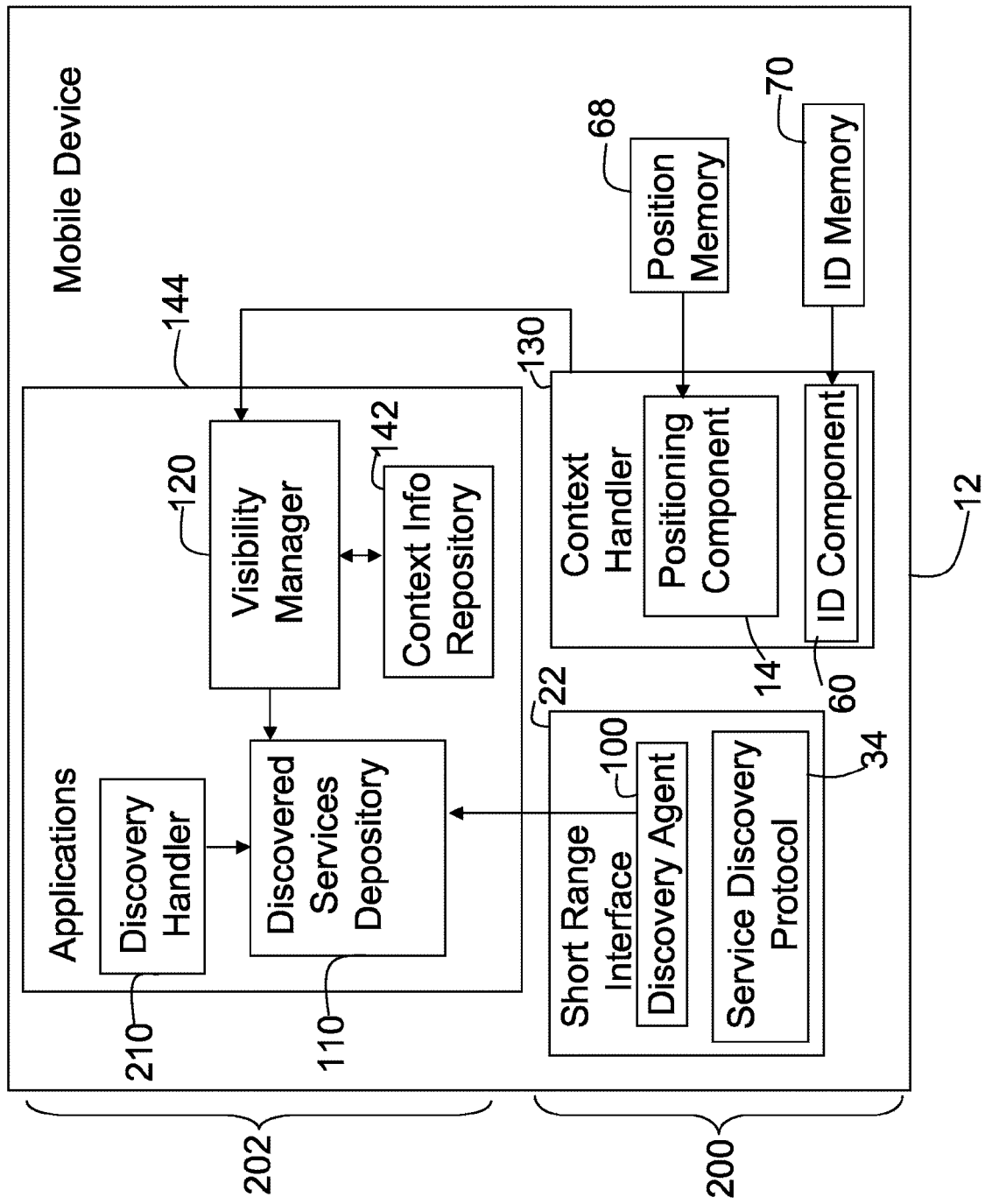
FIG. 4 is a diagrammatic illustration of a portion of another example of a medical communication system.

With reference to FIG. 4, each application 144 includes the discovered services repository 110 and context information repository 142. The functions to keep the information of discovered peers and associated services, and the functions to control the visibilities of such information by using context information are shifted from lower software stacks 200 of the mobile device 12 to running upper applications 202. After getting notification of the discovered service information from the discovery agent 100, a discovery handler 210 updates the records stored in the discovered services repository 110. The visibility manager 120 modifies the visibility fields of corresponding records according to the notification about context information from the context handler 130 by querying context information from the context information repository 142. The context information, e.g. context identification code, peer identification code, and service identification code.

The context handler 130 directly notifies the visibility manager 120 about the new context ID. The visibility manager 120 queries the context service information record and sets the corresponding visibility flag in the discovered service record The information stored in the discovered services repository 110 includes the discovered peer record and discovered services record. The discovered peer record includes peer identification code, peer name, and peer description. The discovered service record includes peer identification code, service identification code, service name, service description, and the visibility flag. The visibility flag can be set to visible or invisible by changing, for example, a flag from 0 to 1, as described above.

The architecture and methods described above are independent of the lower level service discovery protocols and positioning technologies. They are suitable for all the current service discovery protocols and positioning technologies. The UPnP service discovery protocol, Wireless LAN positioning technologies, and RF tag identification technologies are used as examples. Context information and the related service information can be input by the administrator during the deployment phase of the system. The upper applications can also register such context information by calling the context registration engine during the initialization phases.

The invention has been described with reference to the preferred embodiments. Modifications and alterations may occur to others upon a reading and understanding of the preceding detailed description. It is intended that the invention be constructed as including all such modifications and alterations insofar as they come within the scope of the appended claims or the equivalents thereof.

The invention claimed is:
1. A communication system comprising:
   one or more medical peer devices, each medical peer device including a peer-to-peer interface and providing medical services for medical procedures; and a mobile device including:
- a short-range interface device configured to discover one or more medical peer devices and associated peer devices services;
- a positioning component configured to identify a location of the mobile device;
- an identification component configured to read one or more patient identification devices and identifies one or more patients at the location of the mobile device, and reads a clinician identification device and identifies a clinician at the location of the mobile device; and
- a visibility manager configured to limit information and services available to the mobile device to current context relevant information and services which are based on the identity of the one or more patients, the identity of the clinician, and the identified mobile device location, wherein the available information and services is limited to information and services of the one or more identified patients associated to the identified clinician at the location of the mobile device.

2. The system as set forth in claim 1, further including:
a discovered services repository which stores records of the discovered medical peer devices and associated peer devices services.

3. The system as set forth in claim 2, wherein the current context relevant information and services are selected by the visibility manager of the mobile device by setting a visibility flag in the discovered services repository to a visible setting for only those discovered peer devices and associated peer devices services which are one of associated with the one or more identified patients and the mobile device location and accessible for the identified clinician.

4. The system as set forth in claim 3, further including:
- a context registration engine which registers detailed context of each application; and
- a context information repository which stores detailed context information of each registered application including at least an application identification, application associated context information, associated peer devices and associated peer devices services.

5. The system as set forth in claim 4, wherein the mobile device further includes:
- a context handler which matches the current context information with the application associated context information.

6. The system as set forth in claim 5, wherein the visibility manager resets the visibility flag in the discovered services repository based on the matched context information in the mobile device.

7. The system as set forth in claim 6, wherein the context handler continually monitors the context information and the visibility manager resets the visibility flag in the discovered services repository based on the updated matched context information.

8. The system as set forth in claim 1, wherein at least one of the patient and clinician identification devices includes at least one of:
RF tag,
IR tag, and
a barcode.

9. The system as set forth in claim 1, wherein the short-range interface device includes at least one of:
ZigBee interface; and
Bluetooth interface.

10. A communication method comprising:
- identifying a location of a clinician's mobile device with a positioning component of the mobile device;
- identifying the clinician by a clinician identification tag associated with the clinician with an identification component of the mobile device;
- identifying one or more patients by a patient identification tag associated with the one or more patients with the identification component of the mobile device;
- discovering one or more peer devices and associated peer devices services via a short-range interface device of the mobile device;
- generating information and services available to the mobile device for each discovered peer device and associated peer device services;
- limiting information and services available to the mobile device to current context relevant information and services which are based on the identity of the one or more patients, identify of the clinician, and the identified mobile device location with a visibility manager of the mobile device; and
- displaying information and services based on the identity of the one or more patients, identity of the clinician, and the identified mobile device location on a display of the mobile device.

11. The method as set forth in claim 10, wherein the peer devices include at least one of an Electrocardiogram device (ECG), and Electroencephalogram device (EEG), an Electromyogram device (EMG), an invasive blood pressure measurement device (BP), a non-invasive blood pressure measurement device (NiBP), pulse measurement device, cardiac output monitor, respirations measurement device, blood oxygen measurement device ($SpO_2$), and core body temperature measurement device.

12. The method as set forth in claim 11, wherein the patient and clinician identification device includes at least one of:
RF tag,
IR tag, and
a barcode; and
the short-range interface includes at least one of:
ZigBee interface; and
Bluetooth interface.

13. The method as set forth in claim 10, further including:
storing records of the discovered peer devices and associated peer devices services in a discovered services repository in the mobile device.

14. The method as set forth in claim 13, further including:
setting a visibility flag in the discovered services repository in the mobile device to a visible setting for only those discovered peer devices and associated peer devices services which are one of associated with the identified patients and the mobile device location and accessible for the identified clinician.

15. The method as set forth in claim 14, further including:
registering context of each application; and
storing context information of each registered application including at least an application identification, application associated context information, associated peer devices and associated peer devices services in the mobile device.

16. The method as set forth in claim 15, further including:
matching the current context information with the application associated context information with the mobile device.

17. The method as set forth in claim 16 further including:
resetting the visibility flag in the discovered services repository in the mobile device based on the matched context information.

18. The method as set forth in claim 17, further including:
continually monitoring the context information; and
resetting the visibility flag in the discovered services repository in the mobile device based on the updated matched context information.

19. A mobile communication apparatus comprising:
a positioning component configured to identify the location of a mobile communication apparatus;
an identification component configured to identify one or more patients by a patient identification tag associated with the one or more patients and identifies a clinician by a clinician identification tag associated with the clinician;
a short-range interface device configured to discover one or more peer devices and associated peer devices services via a short-range interface device; and
a visibility manager on the mobile communication apparatus configured to limit information and services available to the mobile communication apparatus to current context relevant information and services which are based the identity of the one or more patients, the identity of the clinician, and the identified mobile device location, wherein the available information and services is limited to information and services of the one or more identified patients associated to the identified clinician at the location of the mobile communication apparatus.

20. The mobile communication apparatus according to claim 19, wherein the current context relevant information and services are selected by setting a visibility flag in an discovered services repository in the mobile communication apparatus to a visible setting for only those discovered peer devices and associated peer devices services which are one of associated with the one or more identified patients, the identity of the clinician, and the mobile device location.

* * * * *